United States Patent [19]

Landfield et al.

[11] Patent Number: 5,632,011

[45] Date of Patent: May 20, 1997

[54] ELECTRONIC MAIL MANAGEMENT SYSTEM FOR OPERATION ON A HOST COMPUTER SYSTEM

[75] Inventors: Kent B. Landfield, Papillion; Albert J. Zechmann, Omaha, both of Nebr.

[73] Assignee: Sterling Commerce, Inc., Dallas, Tex.

[21] Appl. No.: 445,855

[22] Filed: May 22, 1995

[51] Int. Cl.$^6$ ................................................. G06F 17/00
[52] U.S. Cl. ................ 395/326; 395/200.18; 395/200.16
[58] Field of Search ......................... 395/200.12, 200.18, 395/600, 829, 839, 200.16, 161

[56] References Cited

U.S. PATENT DOCUMENTS

| | | | |
|---|---|---|---|
| 4,718,005 | 1/1988 | Feigenbaum et al. | 395/200.01 |
| 4,851,988 | 7/1989 | Trottier et al. | 395/200.01 |
| 5,245,532 | 9/1993 | Mourier | 364/400 |
| 5,333,266 | 7/1994 | Boaz et al. | 395/200.01 |
| 5,388,213 | 2/1995 | Oppenheimer et al. | 395/200.16 |
| 5,406,557 | 4/1995 | Baudoin | 370/61 |
| 5,408,619 | 4/1995 | Orah | 395/325 |

OTHER PUBLICATIONS

L.F. Motiwalla et al., "A Knowledge–Based Mail System to Support Managerial Activities," 1989 Annual Hawaii Int'l Conference on System Sciences, vol. III, pp. 650–659.

*Primary Examiner*—Paul V. Kulik
*Attorney, Agent, or Firm*—Baker & Botts, L.L.P.

[57] ABSTRACT

Firewall host systems (26), (28) and (30) interface between private networks (14), (16), (18) and a public network (12). The firewall host systems (26), (28) and (30) manage alias databases (21), (25) and (29). The firewall host system (26) communicates updates to its alias database (21) to the firewall host system (28) which redistributes the updates the firewall host system (30). The firewall host system (30) then reinitializes its alias database (29) using the information received from the firewall host system (26) through the firewall host system (28). In addition, each of the firewall host systems (26), (28) and (30) provide a graphical user interface (66) which allows for the proactive maintenance of mail message queues through the provision of a mail message queue display area (68) and a command area (70) and a search area (74).

8 Claims, 4 Drawing Sheets

1

ELECTRONIC MAIL MANAGEMENT SYSTEM FOR OPERATION ON A HOST COMPUTER SYSTEM

TECHNICAL FIELD OF THE INVENTION

This invention relates in general to the field of data communication systems and more particularly to an improved electronic mail management system.

BACKGROUND OF THE INVENTION

Many organizations interconnect private networks at various sites using a public network to provide for data transfer between the private networks. For example, an organization having multiple sites might allow for electronic mail to be transmitted between the sites through the interconnection of networks which is commonly referred to as the "Internet". The Internet requires TCP/IP addressing but allows for system level and user level aliases to be used to provide for more intuitive addressing of messages. An organization must maintain its database of aliases to insure the proper delivery of smtp e-mail message traffic to the organization.

In the past, maintenance of an alias database has been accomplished by providing for a central repository of alias information. All e-mail message traffic to the organization is then directed to the central repository so that the appropriate address translations and resolution can take place. This approach prevents errors from mismatched aliases or the failure of aliases to be updated on time. However, the central authority approach is very slow to respond to changes in aliases and creates a significant bottleneck in the delivery of messages as all messages must go through a single host machine. Further, the central host becomes a single point of failure for message delivery within the organization.

Another problem area dealing with electronic mail administration in prior systems involves the management of message queues. Most electronic mail systems utilize a process referred to as "sendmail" which will retrieve electronic messages from a message queue, will see to the proper addressing of the message, and will transmit the message to the public network. The message queues themselves are merely a collection of files which include header information, locking information and the actual messages themselves. Depending upon its status, a single message may be associated with as many as five or six separate files in the message queue at any one time. In the past, management of the message queues involved direct manipulation of these numerous files. This approach was extremely prone to error and was so inconvenient that efficient and proactive message queue maintenance was largely ignored. Message queue maintenance is important, however, because undeliverable messages or large queue volume can seriously tax the resources of the host machines as sendmail processes repeatedly attempt to deliver these messages. Dealing with these problem messages and other queue management issues has been a very difficult task in the past.

Accordingly, a need has arisen for an electronic mail management system that allows for the efficient updating and maintenance of electronic mail aliases and allows for the efficient proactive management of electronic mail message queues.

SUMMARY OF THE INVENTION

In accordance with the teachings of the present invention, an electronic mail management system is provided that substantially eliminates or reduces disadvantages associated with prior systems and methods.

According to one embodiment of the present invention, an electronic mail management system is provided that operates on a host computer system coupled between a private network and a public network. The electronic mail management system is operable to receive alias information and format and transmit a site alias information file to a central host computer. The central host computer is operable to receive the site alias file and retransmit the site alias file to all participating host computers. Each host computer is operable to receive the retransmitted site alias file and to reinitialize their alias databases using the new site alias file.

According to another embodiment of the present invention, an electronic mail management system is provided that provides an administrator of the electronic mail system with a graphical user interface to allow for the efficient management of electronic mail queues within a host computer system. According to this embodiment of the present invention, the graphical user interface allows the administrator to bounce messages from the queue, to delete messages from the queue, and to stop and start the actions of the queue as well as other management functions using almost a single step from the graphical user interface.

BRIEF DESCRIPTION OF THE DRAWINGS

A more complete understanding of the present invention may be acquired by referring to the following description taken in conjunction with the accompanying drawings in which like reference numbers indicate like features and wherein.

DETAILED DESCRIPTION OF THE INVENTION

Figure 1:
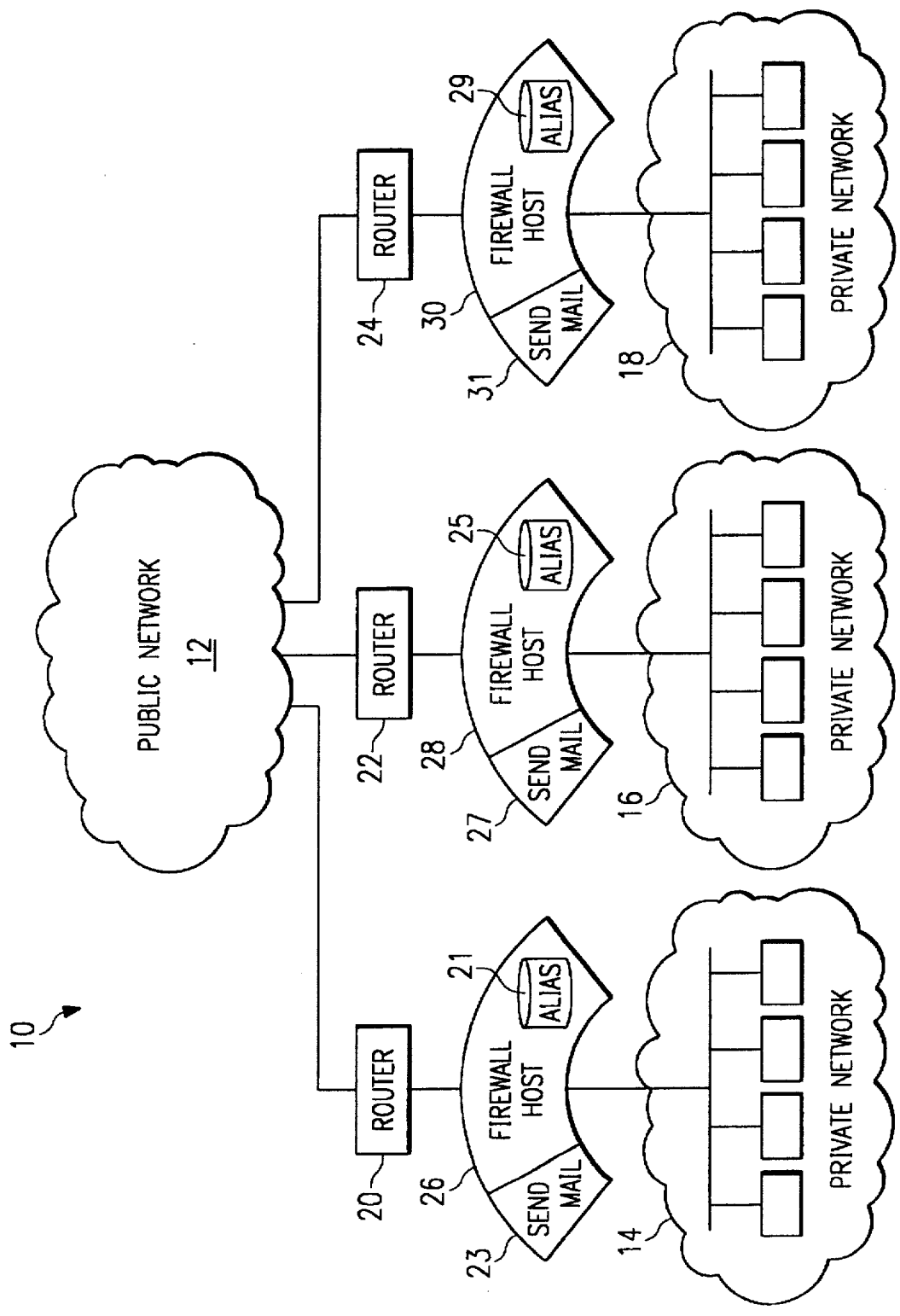
FIG. 1 is a block diagram illustrating the operational environment of the electronic mail management system of the present invention.

Referring to FIG. 1, a communications system 10 is illustrated which comprises a public network 12. Public network 12 may comprise, for example, the interconnection of networks which is commonly known as the "Internet". Public network 12 is accessed by a private network 14, a private network 16, and a private network 18. Traffic from private networks 14, 16 and 18 are directed to the appropriate locations within public network 12 by router systems 20, 22 and 24, respectively. Access control and other management facilities are provided for each of the private networks 14, 16 and 18 by firewall host systems 26, 28 and 30, respectively. Firewall host system 26 comprises an alias database 21 and a send mail process 23. Similarly, firewall host system 28 comprises an alias database 25 and a send mail process 27. Finally, firewall host system 30 comprises an alias database 29 and a send mail process 31.

Alias databases 21, 25 and 29 provide firewall host systems 26, 28 and 30, respectively, with the ability to resolve e-mail addressing of inbound messages routed from the public network 12 to the appropriate users within the private networks 14, 16 and 18. The alias databases 21, 25 and 29 are dynamic datasets which are changed as persons within private networks 14, 16 and 18 change the aliases associated with their mailboxes and as new users are added and old users are deleted from the private networks 14, 16 and 18. In order for uninterrupted access to be provided to the users of the private networks 14, 16 and 18 from the public network 12, it is important that the alias databases 21, 25 and 29 be maintained and that changes in the alias databases are reflected in each location.

In addition, firewall host systems 26, 28 and 30 may also serve as platforms for system log management systems and nameserver administration systems as described in copending U.S. patent application Ser. No. 08/446,213 entitled "System Log Management System" and U.S. patent application Ser. No. 08/446,330 entitled "Nameserver Administration System and Method", assigned to the assignee of the present patent application, the disclosures of which are hereby incorporated by reference.

As discussed previously, prior systems would solve the problem of changing alias databases by maintaining all alias information in a central location. All mail routed to the group of private networks must necessarily be routed through this central location. In contrast, the communications system 10 allows for many access points into the organization associated with private networks 14, 16 and 18. Each of the access points maintains a current alias database for the entire organization through the operation of the electronic mail system of the present invention.

The send mail processes 23, 27 and 31 are used by the firewall host systems 26, 28 and 30, respectively, to process electronic messages which are stored within message queues within the firewall host systems 26, 28 and 30. The manipulation and management of the messages within the queues as they are processed by the sendmail processes 23, 27 and 31 will be discussed more completely herein with reference to FIGS. 3a and 3b which illustrate the efficient graphical user interface that is provided to administrators of the message queues according to the teachings of the present invention.

It should be understood that while the communication system 10 is illustrated comprising three private networks 14, 16 and 18, this is solely for purposes of teaching the present invention and should not be construed to limit the teachings of the present invention to this or any particular number of networks. In order to fully describe the important aspects of the present invention, an example of an update to the alias databases 21, 25 and 29 involving three separate firewall host systems will be described. In this example, an update that is first initiated on firewall host system 26 will be sent to firewall host system 28 for distribution to the entire interconnected system. Firewall host system 30 will be described acting in its role as one of many recipients of the distribution of new information. The example of the operations performed by each of the firewall host systems is provided in FIGS. 2a through 2c. The operations of firewall host system 26 is described in the flow chart shown in FIG. 2a. Similarly, the operations of the firewall host system 28 in this example are shown in the flow chart illustrated in FIG. 2b. Finally, the operations of firewall host system 30 are shown in the flow chart illustrated in FIG. 2c.

Figure 2A:
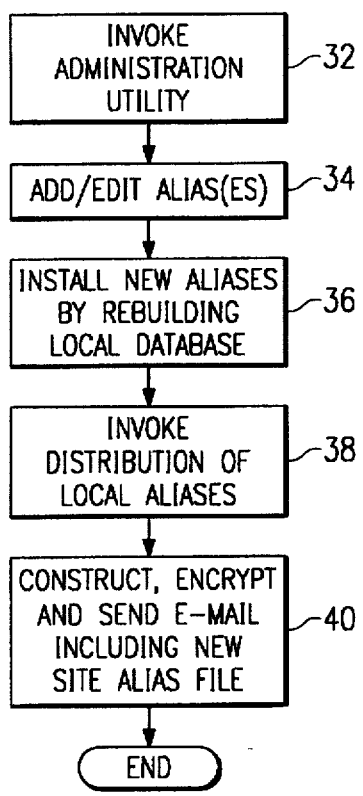
FIGS. 2a through 2c are flow charts illustrating the operation of the electronic mail management system of the present invention.

Referring to FIG. 2a, the process of changing and distributing updates of an alias database is begun in firewall host system 26 when the administration utility is invoked by a user of firewall host system 26 in step 32. The method then proceeds to step 34 where the user of firewall host system 26 manipulates the information in alias database 21 and adds or deletes alias information or edits existing alias information. The method then proceeds to step 36 where the revised alias information is installed on firewall host system 26. This step comprises the rebuilding of the local alias database 21 which results in the construction of a new local site alias information file.

The method then proceeds to step 38 where the user of firewall host system 26 invokes the distribution operation of the new local alias information. The method then proceeds to step 40 where the firewall host system 26 constructs, encrypts and sends an electronic mail message which includes the new local site alias information file. This electronic mail message is routed through router 20 to public network 12 and is addressed to the firewall host system 28.

Firewall host system 28 acts as a central gathering point for the electronic mail messages which include alias information updates. In contrast to prior systems, firewall host system 28 does not need to act as a gathering point for all electronic mail traffic because, as will be seen in FIG. 2b, firewall host system 28 merely reflects the electronic mail message to all host systems within the organization. Each of the host systems is then able to update their own local alias databases.

Figure 2B:
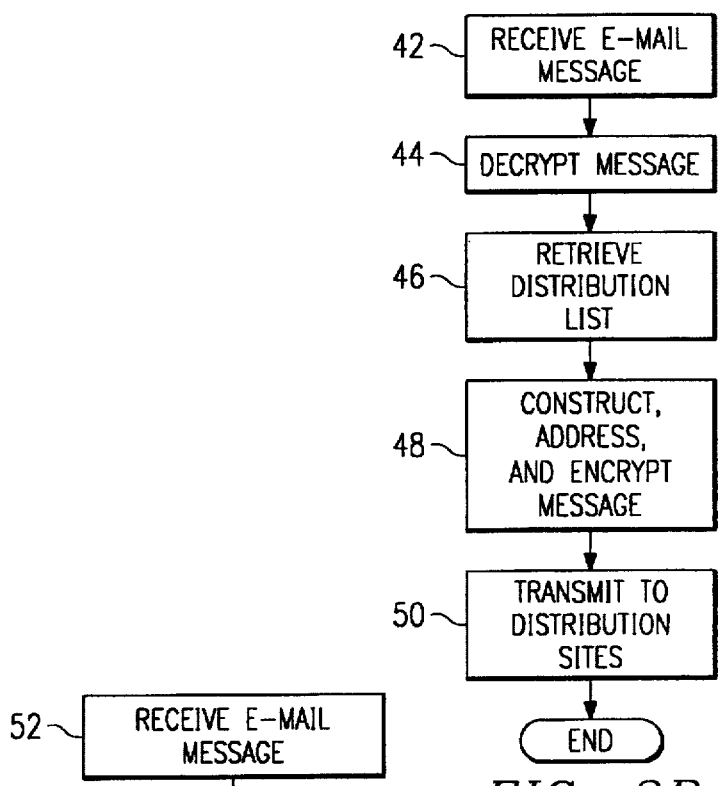

Referring to FIG. 2b, the firewall host system 28 in the present example receives the electronic mail message from firewall host system 26 at step 42. The firewall host system 28 then decrypts the electronic mail message in step 44.

The firewall host system 28 then retrieves a distribution list in step 46 which includes the electronic mailing address for each firewall host system in the organization. In the present example, this distribution list would include firewall host system 28 and firewall host system 30. The method then proceeds to step 48 where the firewall host system 28 uses the distribution list retrieved in step 46 to construct, address and reencrypt an electronic mail message. The electronic mail message includes the updated local site alias information that was transmitted by firewall host system 26 to firewall host system 28. The method then proceeds to step 50 where the firewall host system 28 transmits the encrypted message to all of the distribution sites within the organizations. The method then terminates.

Figure 2C:
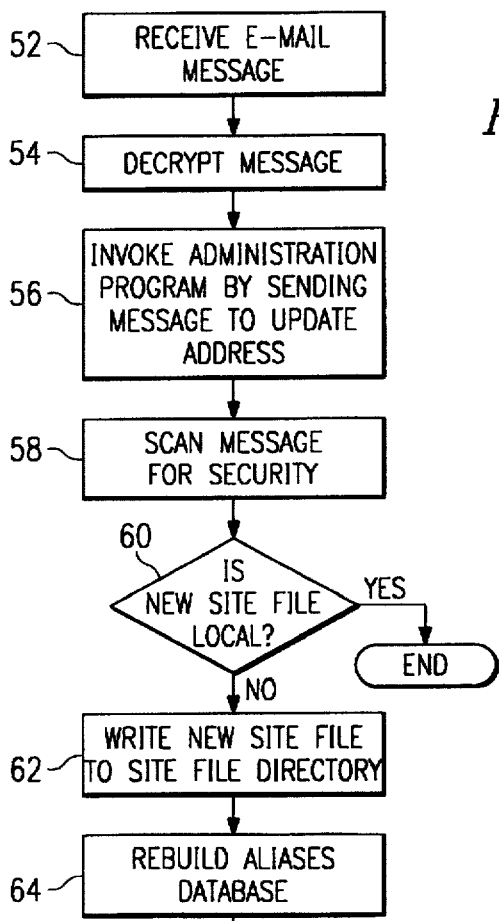

Firewall host system 30, as well as all of the firewall host systems within the organization, receives the electronic mail message from the central firewall host system 28 at step 52 shown in FIG. 2c. The method proceeds from step 52 to step 54 where the firewall host system 30 decrypts the received message. The method then proceeds to step 56 where the firewall host system 30 invokes an administration program by sending the decrypted message to an update address. In this manner, the administration program executing on the firewall host system 30 acts as a node on the private network 18. The firewall host system 30 can send a message to an address which is not an actual node on the private network 18 but is rather a program which, when messages are sent to that address, begins processing with the message as the input to the program.

The administration program begins processing using the decrypted electronic mail message as input and in step 58 it scans this electronic mail message for security concerns. For example, the administration program will scan the electronic mail message to make sure that no executable programs are included within the body of the message. After completing the security scan in step 58, the method proceeds to step 60 where the administration program determines if the new site alias file is associated with the local firewall host system 30. If the new site alias information file originated from the local site, the method terminates because the local firewall host 30 will have already rebuilt its alias database as was described in step 36 with reference to FIG. 2a previously.

However, if the administration program determines in step 60 that the new site alias information file is from a different firewall host system within the organization, the method proceeds to step 62 where the administration program will write the new site alias information file to the site alias information directory. The method then proceeds to step 64 where the administration program will reconstruct the alias database 29 using all of the site alias information files within the site alias information file directory including the new site alias information file received from firewall host system 26 through firewall host system 28. The method then terminates.

As discussed previously with reference to FIG. 1, each of the firewall host systems 26, 28 and 30 comprise a send mail process 23, 27 or 31 respectively. In a "UNIX" or similar processing system implementation, the inbound portion of the send mail process that processes mail received from public network 12 comprises a daemon which is always operating on each of the firewall host systems 26, 28 and 30 to receive electronic mail messages from the public network 12 and place them in a mail message queue within each of the firewall host systems 26, 28 and 30. When mail messages are present in the queue, firewall host system 26, 28 and 30 will spawn one or more send mail processes in order to deliver the messages within the mail message queue. Often, messages will be present in the queue which are undeliverable for a variety of reasons. These messages will continue to cause outbound send mail processes to be spawned and will thus tax the processing resources of the firewall host systems 26, 28 and 30. For this and other reasons, the electronic mail management system of the present invention provides for a mail queue maintenance graphical user interface which displays the current status of the mail message queue and which provides for maintenance functions to be presented to the administrator in a convenient, graphical presentation.

Figure 3A:
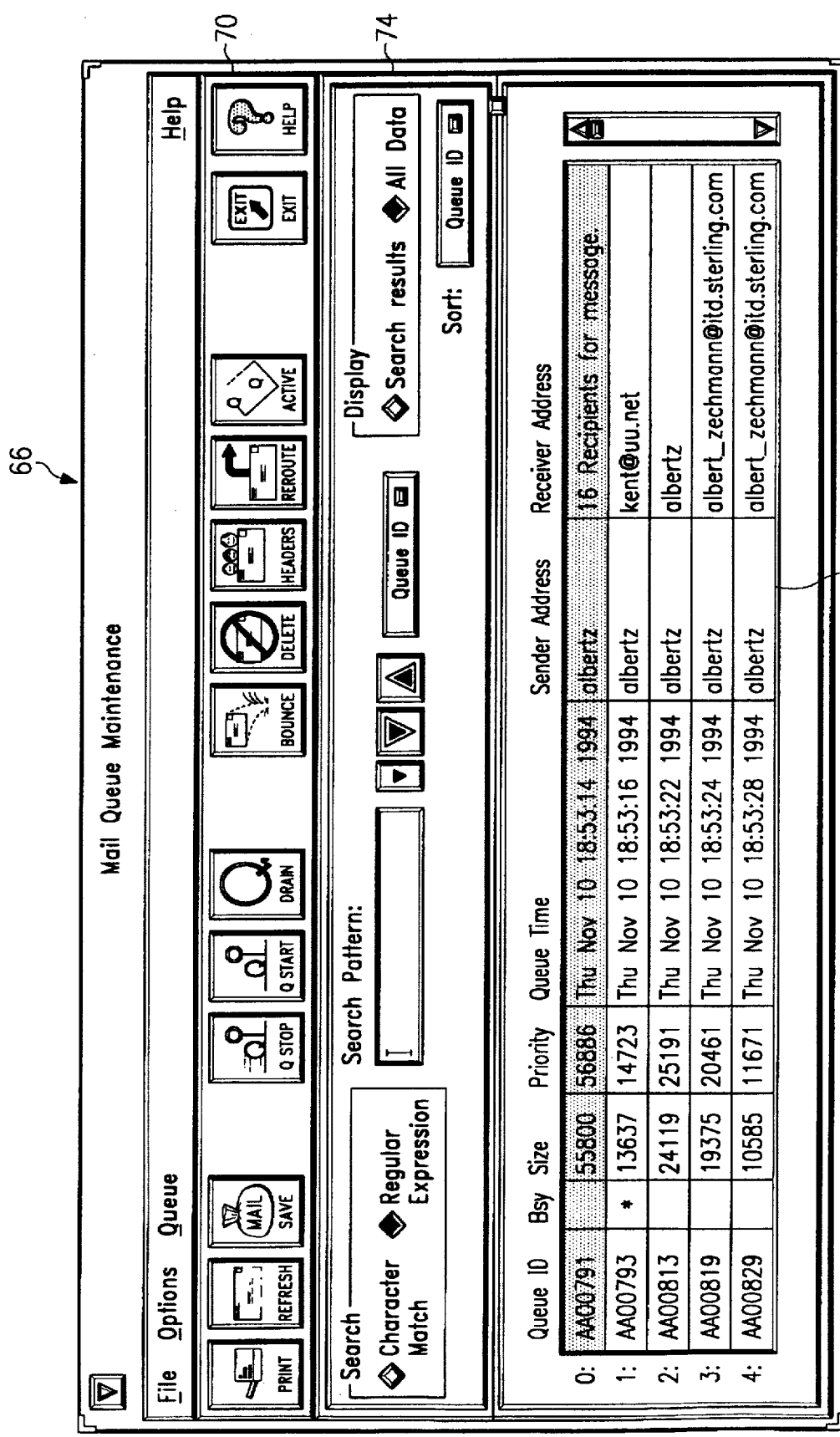
FIGS. 3a and 3b are illustrations of the graphical user interface of the electronic mail management system of the present invention.

FIG. 3a is an illustration of a graphical user interface, indicated generally at 66, that comprises a queue display area 68. Queue display area 68 presents the administrator of the mail message queue with seven columns of information about each message that is present in the mail message queue. Reading from left to right in FIG. 3a, the queue display area 68 displays the queue identification, a busy indication which indicates whether or not a send mail process is currently attempting to deliver the message, a size indication indicating the size of the message, a priority indication indicating the priority of the message, a queue time indicating the time at which the message was placed in the mail message queue and the sender and receiver addresses associated with the messages.

As shown in FIG. 3a, the top message on line 0 has been selected. Single messages within the message queue or multiple messages within the message queue can be selected at one time in order to have operations performed on them.

The graphical user interface 66 also comprises a command area 70 which comprises push buttons to exit the maintenance facility and to elicit help. In addition, push buttons are provided to print selected information, to save messages to disk files or other facilities and to refresh the queue display area 68 on demand by accessing the actual mail message queue and displaying the information that is located there. The display is automatically updated periodically.

The graphical user interface 66 also comprises a queue command region which includes a number of queue maintenance buttons, including a queue stop, a queue start and queue drain button. The queue stop button will terminate the sendmail daemon that may be attempting to deliver messages. The queue stop button will also create a situation where the firewall host system will not accept any more inbound mail. In this instance, the public network 12 will attempt to redeliver the message to the firewall host system at a later time. The queue start button restarts the sendmail daemon after the queue has been stopped. The queue drain button shown in FIG. 3a will force a send mail process to be initiated even if other send mail processes are already in place attempting to deliver messages. As such, an administrator can proactively clear many or all messages in the mail message queue by repeatedly hitting the queue drain button to force the firewall host system to spawn new send mail processes. This can be very useful because a single send mail process can remain occupied with a single message if, for example, that message has a large number of recipients.

The graphical user interface 66 also comprises a mail command region which includes a number of mail management push buttons. The graphical user interface 66 includes a bounce button, a delete button, a headers button, a reroute button and an active processes button shown in FIG. 3a.

The bounce button will force a return to sender operation to be performed on any selected messages within the queue. In prior systems, this operation was extremely difficult to perform because prior systems used a command line interface and required the editing of multiple files in order to alter the intended address of a message and to edit the message itself to inform the sender that his message had been bounced. According to the teachings of the present invention, the bounce operation is greatly simplified in that the activation of the bounce command will bring a bounce dialogue box to the screen such as a bounce interface 72 shown in FIG. 3b.

Figure 3B:
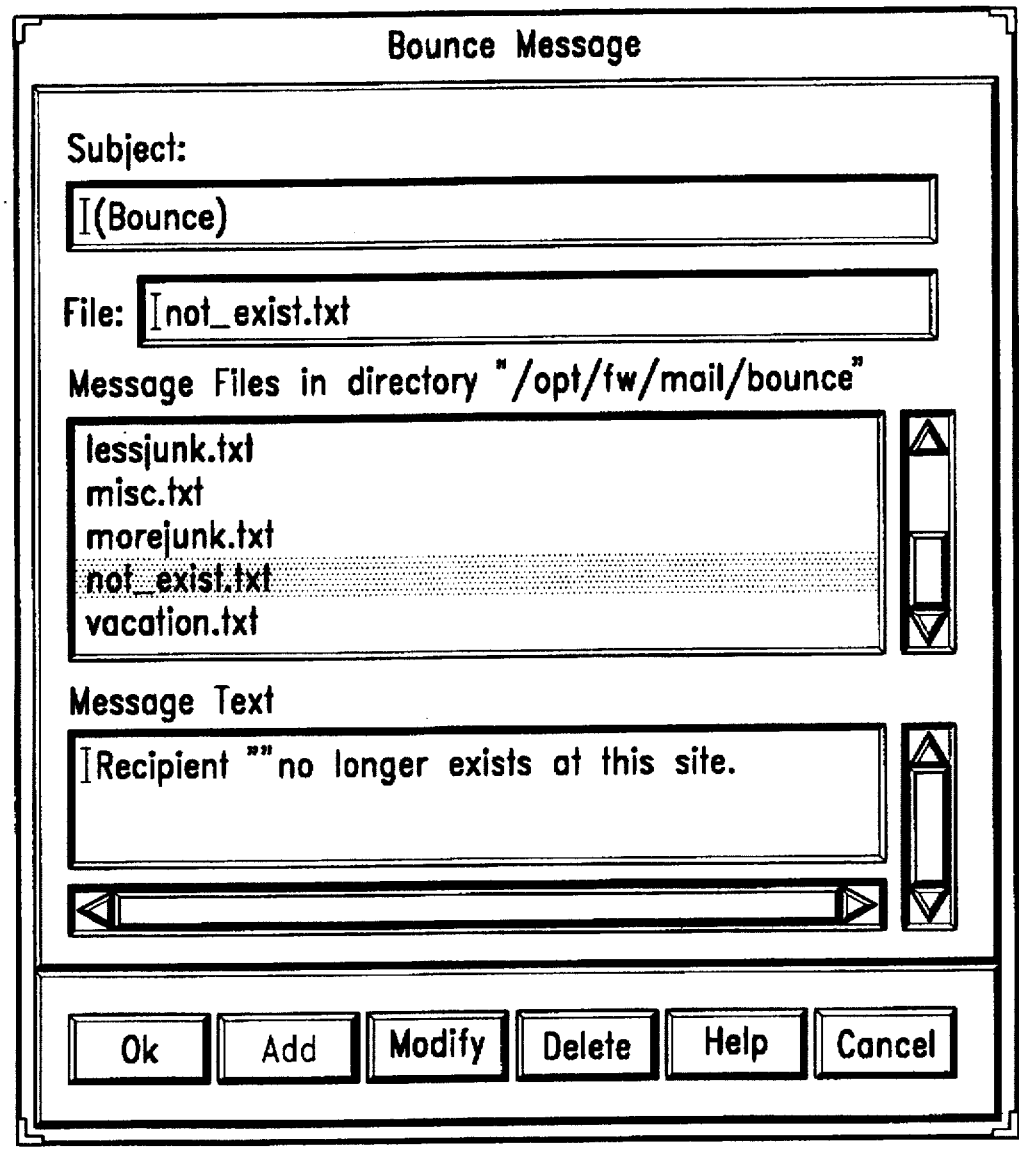

According to the teachings of the present invention, the bounce command automatically locates the header file for the message to be bounced and prepends the character string "(bounce)" to the front of the subject line of the message. In addition, message text which can be selected by the administrator is prepended to the message itself. As shown in FIG. 3b, bounce interface 72 may include a number of preformatted messages to be included as a portion of the message text to a bounced message. In the example shown in FIG. 3b, the words "recipient no longer exists at this site" will be inserted into the message. Other messages can also be prepended to the text of the message. For example, the sender could be informed that the recipient is on vacation. In addition, the sender could be informed that because of the use of the system of the present invention, his message was bounced but that the text of his message was not read prior to bouncing. In prior systems, the editing of the message text itself necessarily involved opening the message text file. This operation allowed the administrator to read the text of the electronic message intended for someone else. Using the present invention, the message may be bounced and message text may be inserted into the message without the administrator ever having read access to the electronic message itself.

Referring again to FIG. 3a, the command region 70 also includes a delete button. The delete command will delete from the queue any messages that have been selected in the queue display region 68.

The command region 70 also includes a headers button. The headers command will display the header information for any selected entries in the message queue. The header of a message contains a great deal of information that is useful to an administrator in attempting to solve problems with his messaging system. For example, improper addressing of source and recipients and other information is contained in electronic mail message headers.

The command region 70 also includes a reroute button. The reroute command allows the administrator to access the header of a selected message, enter a new address for the message, and put the message back into the queue for redelivery. The reroute command allows mail that has mistakenly been placed in a queue for a recipient that no longer exists at that delivery location because of a change in address or a change in alias to be redirected to the correct address. This situation might occur for mail that was in the process of being delivered when a change in address or change in alias was made.

The command region 70 also includes a queue active button. The queue active button brings forth a dialogue box that contains a listing of all running/active sendmail processes and the queue i.d.s associated with each, except possibly for the daemon process. By selecting one or many of the processes, a terminate option is provided which will terminate that process and reenter that message in the message queue.

The send mail processes can also be accessed by double clicking on the queue i.d. portion of a message entry within message queue display region 68.

The graphical interface 66 also includes a search command region 74 shown in FIG. 3a. Through manipulation of search region 74, an administrator can select whether a character match or regular expression search is to be performed. The search pattern can be entered in the search pattern window shown in FIG. 3a. Preselected search patterns may also be stored and selected using the up and down arrows to the right of the search pattern window. Using the search capabilities of the electronic mail system of the present invention, single messages within the current message queue or multiple messages within the current message queue can be selected by searching for character strings within the header information associated with the messages.

According to the teachings of the present invention, a mail queue maintenance system is provided that allows for the proactive maintenance of the mail message queue prior to the delivery of the messages within that queue. An administrator is presented with a graphical representation of all of the messages within the queue at any particular time and the status of those messages in terms of delivery and the send mail processes associated with the messages. On the same graphical user interface, the administrator is provided with a variety of commands to manipulate messages within the mail message queue. These commands are presented as graphical radio buttons. The mail message maintenance system of the present invention performs all of the file maintenance required to perform the various commands instituted by the administrator. A single message within a message queue could have up to a half a dozen files associated with the message. Prior systems required cumbersome command line interfaces and file manipulation. Improper manipulation of these files could create orphan files or could result in the unwanted deletion of messages within the queue.

According to another aspect of the mail maintenance system of the present invention, a sanity check is performed each time the message queue is stopped or started. According to this aspect of the present invention, the queue is searched for orphan files each time the queue is stopped. These orphan files are deleted to prevent unnecessary use of storage facilities and potential confusion within the queue itself.

According to the teachings of the present invention, an electronic mail management system is provided that provides for both the efficient maintenance of alias databases and the proactive maintenance of electronic mail message queues.

Although the present invention and its advantages have been described in detail, it should be understood that various changes, substitutions and alterations can be made therein without departing from the spirit and scope of the invention as defined by the appended claims.

What is claimed is:

1. An electronic mail management system for operation on a host computer system including a message queue storage, the management system comprising:

a graphical user interface operable to access the message queue storage facility and to display information associated with each message present in the message queue storage facility;

a mail command region displayed within the graphical user interface and operable to receive commands operable to manipulate selected messages within the message queue storage facility, the mail command region comprising a queue active command operable when activated to display the status of all processes operating in the host computer system that are presently attempting to send/receive messages present within the message queue storage facility; and a queue command region displayed within the graphical user interface operable to receive commands affecting the operation of the message queue storage facility.

2. The system of claim 1 wherein the mail command region comprises a delete command operable when activated to delete selected messages within the message queue storage facility.

3. The system of claim 1 wherein the mail command region comprises a headers command operable when activated to cause header information for the selected messages within the message queue storage facility to be displayed.

4. The system of claim 1 wherein the mail command region comprises a reroute command operable when activated to allow a user of the system to readdress and resend a selected message present within the message queue storage facility.

5. The system of claim 1 wherein the queue command region comprises a drain command that when activated causes the host computer system to spawn a new process that will attempt to send a message present within the message queue storage facility.

6. The system of claim 1 wherein the graphical user interface further comprises a search region operable to allow for entry of a search pattern that when activated will cause messages within the message queue storage facility that match the search pattern to be selected.

7. An electronic mail management system for operation on a host computer system having a message queue storage facility operable to store one or more messages, each message having a subject line and a body, the management system comprising:

a graphical user interface operable to access the message queue storage facility and to display information associated with each message; and a command region displayed within the graphical user interface and operable to allow an administrator to edit the subject line of a message without accessing the body of the message.

8. An electronic mail management system for operation on a host computer system including a message queue storage, the management system comprising:

a graphical user interface operable to access the message queue storage facility and to display information associated with each message present in the message queue storage facility;

a mail command region displayed within the graphical user interface and operable to receive commands operable to manipulate selected messages within the message queue storage facility, the mail command region comprising a bounce command interface that when activated causes a bounce graphical interface to be displayed, the bounce graphical interface allowing an administrator to rewrite a subject line of a selected message and to prepend textual material to the selected message without accessing a body of the selected message, the bounce graphical interface causing the selected message to be readdressed to an original sender of the selected message and to be reentered into the message queue storage facility for delivery back to the original sender; and a queue command region displayed within the graphical user interface operable to receive commands affecting the operation of the message queue storage facility.

* * * * *

UNITED STATES PATENT AND TRADEMARK OFFICE
CERTIFICATE OF CORRECTION

PATENT NO. : 5,632,011
DATED : May 20, 1997
INVENTOR(S) : Landfield, et al.

It is certified that error appears in the above-indentified patent and that said Letters Patent is hereby corrected as shown below:

Column 5, line 52, after "time", delete "ill", and insert
-- in --.

Signed and Sealed this

Second Day of September, 1997

Attest:

BRUCE LEHMAN

Attesting Officer        Commissioner of Patents and Trademarks